United States Patent [19]

Alix et al.

[11] Patent Number: 5,037,585
[45] Date of Patent: Aug. 6, 1991

[54] AIR CONDITIONING HUMIDIFIER

[75] Inventors: Guy-Paul Alix; Marc Kohler, both of Brest; Jean M. Tranvoez, Bouffemont, all of France; John M. Manchec, Simi Valley, Calif.

[73] Assignee: Industrielle du Ponant SA, France

[21] Appl. No.: 623,274

[22] Filed: Dec. 6, 1990

Related U.S. Application Data

[63] Continuation of Ser. No. 358,126, May 26, 1989, abandoned.

[30] Foreign Application Priority Data

Jun. 3, 1988 [FR] France ............... 88 07594
Oct. 27, 1988 [FR] France ............... 88 14379
Feb. 14, 1989 [FR] France ............... 89 02063

[51] Int. Cl.⁵ .................................... B01F 3/04
[52] U.S. Cl. .................... 261/142; 261/116; 261/78.2; 261/81; 261/DIG. 48
[58] Field of Search .............. 261/116, 118, 78.2, 261/DIG. 48, 81, 142; 219/362, 273, 276

[56] References Cited

U.S. PATENT DOCUMENTS

| 2,091,606 | 8/1937 | Murray | 261/116 |
|---|---|---|---|
| 2,438,868 | 3/1948 | Trier | 261/116 |
| 2,667,384 | 1/1954 | Phipps | 261/78.2 |
| 2,860,228 | 11/1958 | Boyle et al. | 219/273 |
| 3,004,540 | 10/1961 | Ronzi | 219/276 |
| 3,570,472 | 3/1971 | Santangelo | 261/116 |
| 3,584,193 | 6/1971 | Badertscher | 219/362 |
| 3,703,259 | 11/1972 | Sturgess et al. | 261/116 |
| 3,761,065 | 9/1973 | Rich et al. | 261/116 |
| 3,922,153 | 11/1975 | Engalitcheff, Jr. et al. | 261/116 |
| 4,347,823 | 9/1982 | Kessler | 261/116 |
| 4,732,326 | 3/1988 | Bessling et al. | 261/118 |

FOREIGN PATENT DOCUMENTS

| 1421337 | 3/1970 | Fed. Rep. of Germany | 261/116 |
|---|---|---|---|
| 1604305 | 10/1970 | Fed. Rep. of Germany | . |
| 1266302 | 5/1961 | France | . |
| 1512711 | 1/1968 | France | . |
| 455748 | 1/1975 | U.S.S.R. | 261/78.2 |
| 909457 | 2/1982 | U.S.S.R. | 261/78.2 |
| 932118 | 5/1982 | U.S.S.R. | 261/DIG. 48 |

Primary Examiner—Tim Miles
Attorney, Agent, or Firm—Laff, Whitesel, Conte & Saret

[57] ABSTRACT

An aircraft air conditioning system circulates hot air to a humidifier having an atomized or vaporized water generator (2, 35). The exit of the water generator is located at the apex of a conical surface (20, 27, 42) which diverges in the direction of air circulation. The conical surface is pierced by holes (21) through which the hot air passes while encountering and mixing with the water particles or the water vapor mixes them there and carries them along. The conical surface is a surface of revolution (27) opening downstream. The apex of the conical surface is practically in the form of a spherical cap. The center of the apex is pierced by an outlet passage of the generator (2, 35).

15 Claims, 4 Drawing Sheets

AIR CONDITIONING HUMIDIFIER

This application is a continuation of application Ser. No. 07/358,126, filed 5/26/89, now abandoned.

The present invention relates to a humidifier for an air conditioning system, and, more particularly, for an aircraft air conditioning system.

All air conditioning systems comprise a humidification chamber. Originally, the humidification devices had centrifugal injectors designed to disperse the water, and the dispersed water was carried along by compressed air. Nevertheless, the degree of atomization of the water was insufficient, so that it was necessary to provide a a collecting tank to recover the unvaporized water. It was then proposed to use compressed air injectors producing the atomization of the water. To reduce the length of the humidification devices it became the practice to orient the compressed air jets atomizing the water in the opposite direction to that of the air to be humidified. In this regard one may refer to document FR-A-1 266 302 and FR-A-1 512 711. These installation have the disadvantages that they require a large amount of water, that they are, therefore, heavy and that they are nevertheless cumbersome. Moreover, for a better yield they require a heating of the water to be atomized. This involves a not inconsiderable expenditure of energy. Finally, any heating of water, without precaution, involves deposits of tartar.

In document DE-A-1 604 305 there is described a humidifier in which the water emerging from a nozzle is subjected to the action of an ultrasonic generator which brings about an atomization of the water, the particles of which are carried along by the air to be humidified. In this humidifer nothing is provided to assure a good mixing of the atomized water and the air.

Air conditioning installations designed to operate in passenger airplanes must be as light as possible. From this it results that the humidifiers first mentioned above are unsuitable.

In practice, transport airplanes perform at a high altitude where the temperature is strongly negative and the rarefied air completely dry. The humidifers, therefore, must satisfy particular conditions. The device described in document DE-A-1 604 305, which can be light, is not suitable, for a part of the air atomized by ultrasound condenses on the walls of the air conduit.

Lastly, the humidifiers for atomizing with ultrasound give satisfaction insofar as atomization proper is concerned, when demineralized water is used. In practice it is more economically to use tap water. This, however, contains minerals in variable amounts. For a mineralization of base 1 in New York, N.Y., U.S.A., one has a mineralization of 40 in California. This water produces spray on evaporating. It has to be purified, therefore, which is expensive. On the other hand, a purification carried out on board an airplane involves heavy equipment and a substantial consumption of water. To produce six liters of purified water there are needed forty liters of tap water.

An object of the invention is to provide a humidifier which does not suffer from the disadvantages mentioned above, whose device for atomizing water is light and little cumbersome and which, above all, improves the mixing of the atomized water and the air.

Another object of the invention is to provide a humidifier that can function with various generators of atomized water.

According to a characteristic of the present invention there is provided a humidifier comprising, in a circulation shell of hot air to be humidified, a generator of atomized or vaporized water, the entry of which receives water in a liquid state and the exit of which delivers particles of water or of water vapor to the apex of a cone diverging in the direction of air circulation and extending to the wall of the shell, the lateral surface of the cone being pierced with holes through which the hot air passes to encounter the particles of water or vapor and to carry them along.

According to a characteristic of the invention the divergent cone is an open surface of revolution like a cone, but the apex of which has practically the form of a spherical cap, the center of which apex is pierced for the passage of the output of a generator or atomized or vaporized water, and the surface of revolution extending to the wall of the shell and being pierced by holes through which the hot air passes.

According to another characteristic, the surface of revolution is consistuted by a pierced spherical cap and its center is extended by a conic frustum.

According to another characteristic, the semi angle at the apex of the conic frustum is on the order of 15°.

According to another characteristic, the generatrix of the surface of revolution is is a parabola pierced at the center of its apex.

According to another characteristic the tangent to the parabola at the point of contact with the shell forms an angle on the order of 15° with the axis of the shell.

According to another characteristic the generatrix of the surface of revolution is a branch of a hyperbola pierced at the center of its apex.

According to another characteristic, each asymptote of the hyperbola forms an angle on the order of 15° with the axis of the shell.

According to another characteristic the opening provided at the apex of the surface of revolution is provided with an air entry nozzle in Venturi form.

According to another characteristic the smallest diameter of the Venturi nozzle is equal to approximately 0.2 times the diameter of the shell.

According to another characteristic, the lateral wall of the cone incorporates electric resistances.

According to another characteristic the atomized water generator is an ultrasonic water atomizer.

According to another characteristic, the vaporized water generator is a source of water vapor.

According to another characteristic, the water vapor generator is constituted by a receptacle containing the water and of which the exit is at the base of the cone, with electrodes fed by electric current plunging into said receptacle.

According to another characteristic, downstream of the cone there is provided, transversely to the shell, an evaporator.

According to another characteristic, downstream of the cone, there is provided, transversely to the shell, a trap for drops of water.

According to another characteristic, the trap for drops of water is formed of a plurality of small longitudinal ducts forming, for example, a honeycomb structure.

According to another characteristic, the entrance of liquid water of the water atomizer is connected to a tank by a valve regulating the flow of liquid water, the tank being provided with a system of refilling to a constant water level.

According to another characteristic, the air volume of the tank is at the same pressure as the hot air of the shell upstream of the atomizer.

The characteristics of the invention mentioned above, as well as others, will appear from clearly from the reading of the following description of an example of execution, said description being made with reference to the appended drawings, in which.

Figure 1:
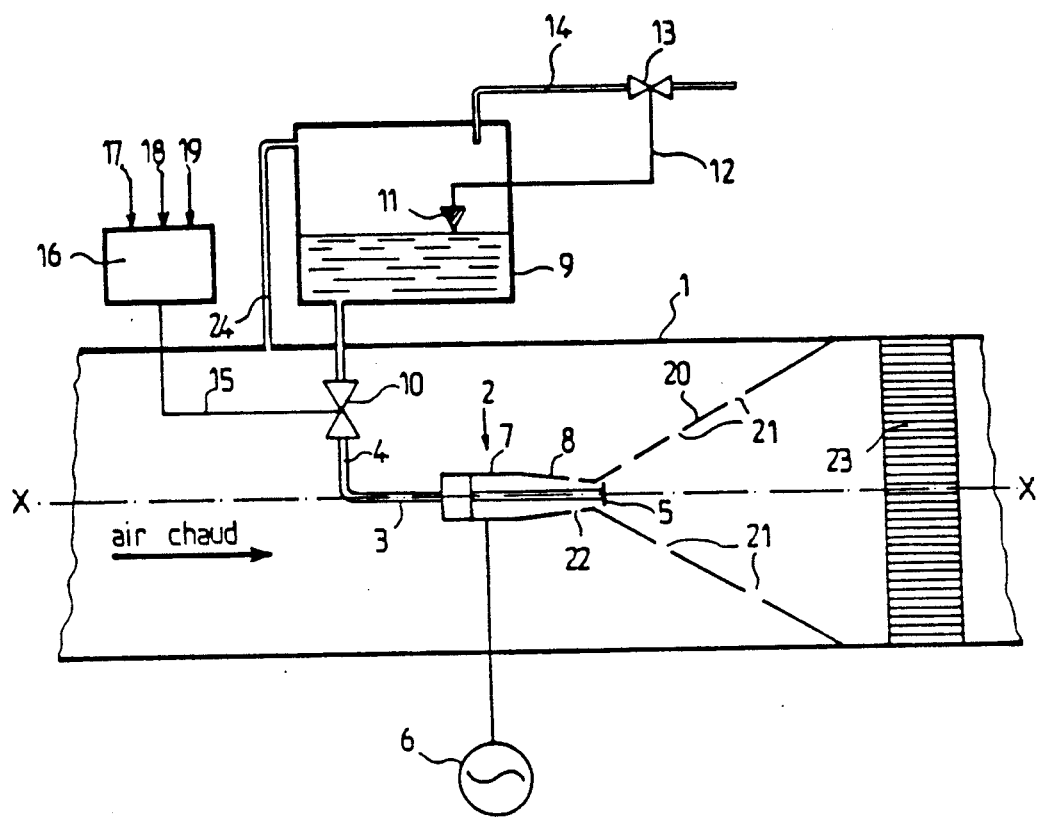
FIG. 1 is a schematic view of a first example of a humidifier according to the invention.

In FIG. 1, in a cylindrical shell 1 in which hot, reheated or preheated air circulates, the direction of circulation, as the arrow indicates, is from left to right as seen in FIG. 1, there is installed an ultrasonic water atomizer 2, the means of fixation of the atomizer 2 in the shell 1 not being shown. The atomizer 2 comprises a tube 3, the entrance of which is connected to a transverse tube 4 for the supplying of liquid water and the exit of which is connected to a diffuser 5, formed of a small circular capsule presenting small orifices on its periphery. Further, the tube 3 is subjected to ultrasonic vibrations of a quartz crystal (not shown) fed by an electric oscillator 6, the frequence of which is adapted to the characteristics of the quartz.

The atomizer 2 is completed by a cylindrical housing 7 ending at the side of the diffuser 5 by a slightly convergent conical part 8. The axis of the housing coincides with that of the tube 3 and the axis X—X of the shell 1.

The transverse tube 4 is connected to the bottom of a water tank 9 by a regulating valve 10. The tank 9, located outside the shell 1, comprises a system for maintaining a constant level, schematically represented by a float 11 connected by a control linkage 12 to a valve 13 mounted on a water feed tube issuing into the tank 9. The control entrance of the valve 10 is connected by a linakge 15 to a control circuit 16, the entrances 17 to 19 of which receive signals emitted by an ambience hygrostat, a shell hygrostat and a pressostat, these three apparatuses not being shown. The signal furnished by the pressostat varies as a function of the altitude.

To the small base of the conical part 8 of the housing 7 there is connected the small base of a cone 20 of axis X—X, the large base of which is solidly joined to the inner surface of the shell 1.

The lateral wall of the cone 20 is, as shown, pierced by holes 21 by which the hot air enters the cone. The flow system of the air which passes by the holes 21 downstream of the cone is turbulent, which assures a homogeneous mixing of the air and particles of water emitted by the diffuser 5.

Holes 22 are likewise provided in the conical part 8 of the housing 7 in such a manner as to let the hot air of entrainment pass behind the diffuser 5. In practice, the loss of pressure created by the pierced cone 20 is sufficient to obtain a good flow of this entraining air.

Downstream of the cone 20 there has been shown an evaporator 23 mounted transversely to the shell 1. The evaporator 23 can be executed in the form of a plurality of longitudinal channels of small section, forming altogether a honeycomb structure, for example. The material of the walls of the ducts can be any filtering medium or an absorbent material, such as blotting paper, etc. In practice the relatively large drops of water possibly carried downstream of the cone 20 are trapped on its wall of filtering medium or they spread to restore then the water in the form of vapor.

Between the top of the tank 9 and the wall of the shell 1, upstream of the cone 20, there is provided a tube 24 open on two ends to equalize the pressure above the water of the tank and at the entrance of the shell 1.

Around the neck of the nozzle 25 there is connected the edge of a hole 26 pierced at the apex of a surface of revolution 27 of axis X—X, which is open toward downstream of the shell 1 and which extends up to this latter to be joined there by a ring 28. In the example of execution described, the surface of revolution 27 has a generatrix in the form of a hyperbola the asymptotes H—H and H'—H' of which are plotted in mixed lines. Other forms of the surface of revolution are possible, such as those which have been mentioned in the preamble, or again forms similar to these. Preferably the radius of curvature at the apex of the surface of revolution 27 should be equal to 1/6 of the distance between this apex and the center of the ring 28.

The lateral wall of the surface of revolution 27 is pierced by holes 21 analogous to the holes 21, FIG. 1, by which the hot air enters this surface. The system of air flow downstream from the surface 27 is turbulent, which also assures a homogeneous mixing of the air and the water particles emitted by the diffusor 5.

Holes 15 are likewise provided in the cylindrical housing 7, upstream of the nozzle 25, in such a manner as to allow the hot entraining air to pass behind the diffusor 5. In practice, the loss of pressure created by the surface 27 pierced by holes 21 is sufficient to obtain a good flow of this entraining air.

There has been provided in the internal volume of the surface of revolution 27 a temperature probe 29 which carries on its outer surface a honeybcombed covering membrane. This membrane is moistened by the fog of atomized water, but the air evaporates here, there being given the current of air, which creates a cooling. Accordingly, the probe 29 measures the moist temperature of the humidified air.

Upstream of the atomizer 2 there has likewise been provided a temperature probe 30, which measures the temperature of the air on entering. Finally, downstream of the atomizer 2, there has been provided a third temperature probe 31, which measures the exit temperature. The difference between the temperatures measured by the probes 30 and 31 is normally negative, which corresponds to the cooling due to evaporated water.

The three probes 29, 30 and 31 are connected to the corresponding inputs of a microprocessor, which delivers a control signal to the regulating valve 10. The valve 10 can, for example, function altogether or not at all for a period of time determined each time that it has been open, i.e., the mean flow of water which passes through it is determined by the frequency of its openings.

In practice, the data collected by the probe 29 are used in the microprocessor 32 to cause the frequency of the openings to vary. The difference of the temperatures collected by the probes 30 and 31 serves, for example, to release an alarm if it is too weak, which implies an insufficient evaporation. This difference can also be used by the microprocessor 32 to increase the functioning time of the valve on each opening, in order to achieve the difference value desired.

As an example, for a shell 1 of a diameter of 150 mm, the angle of the asymptotes H—H and H'—H' with the axis X—X can be 15°. In the drawing of FIG. 1 this angle of 15° has not been respected, the abscissas along the axis X—X being compressed. Thus, with an angle of 15° the distance between the ring 28 and the apex of the surface 27 would be approximately 250 mm.

Figure 2:
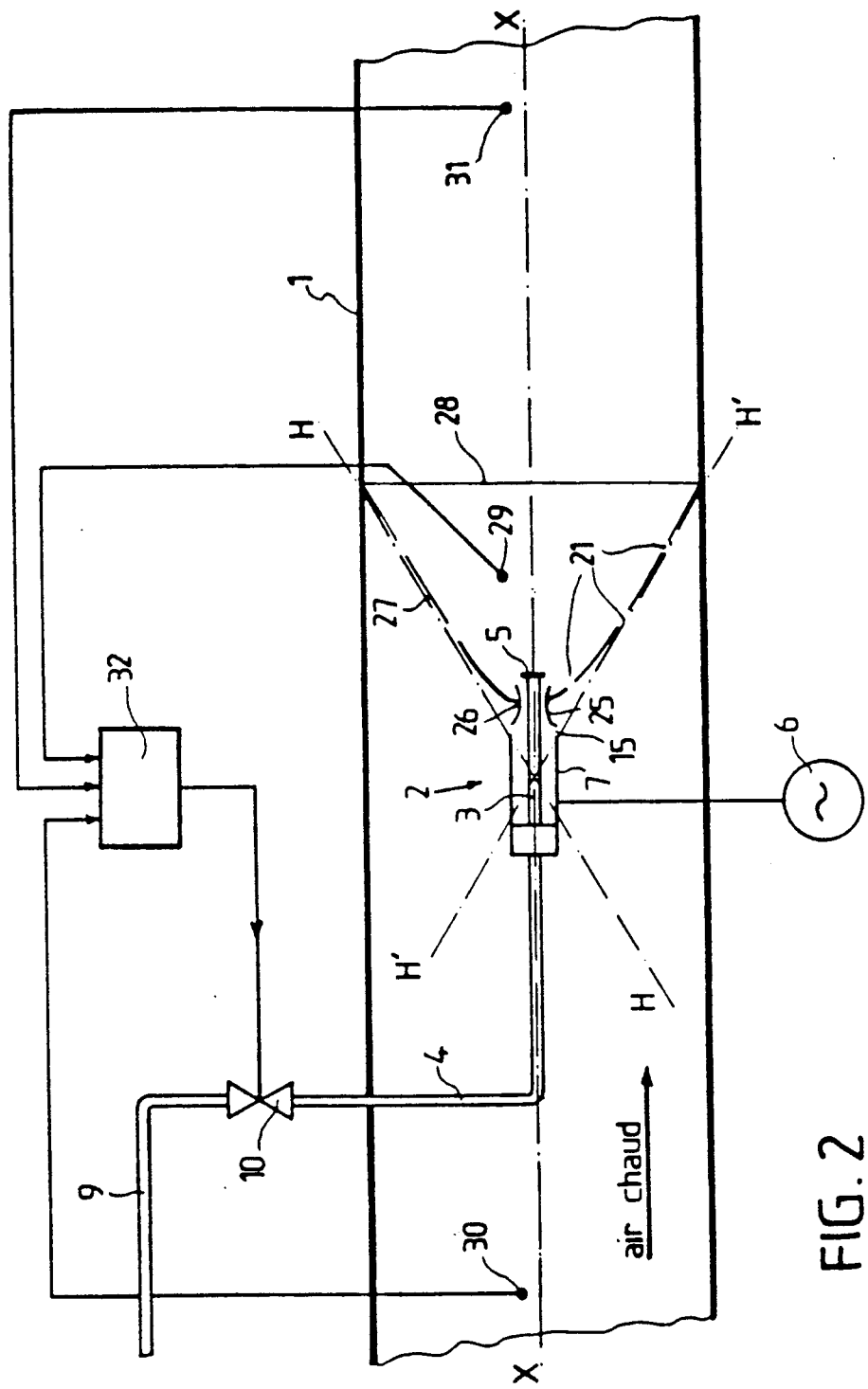
FIG. 2 is a diagram of a variant of the humidifier of FIG. 1.
Figure 2A:
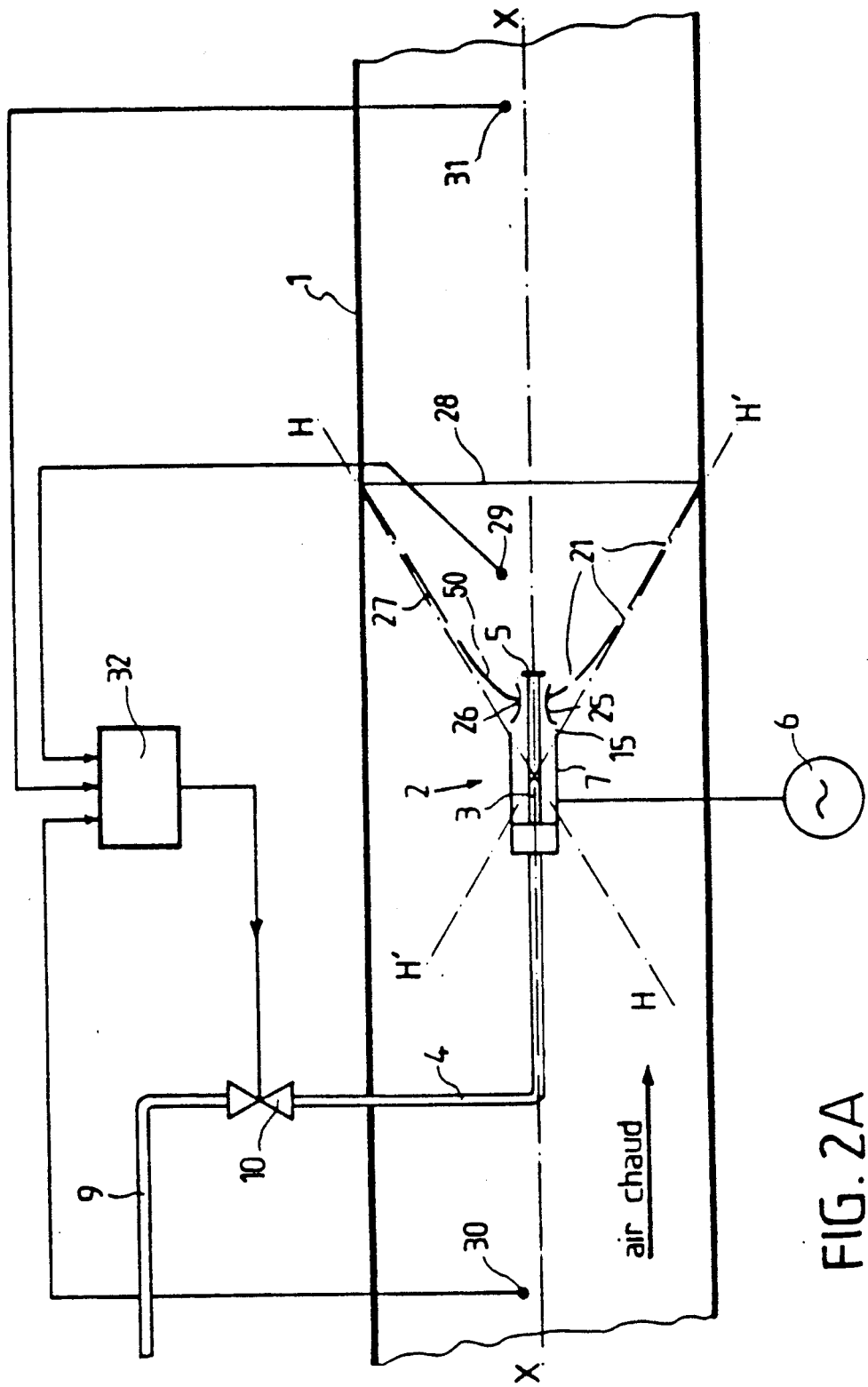
FIG. 2A shows an embodiment with a spherical cap.

In practice, always with respect to the example of execution of FIG. 2, the minimal diameter of the Venturi nozzle 25 can be on the order of 30 mm, or approximately 2/10 of the diameter of the shell. The surface of revolution 27 may carry five rows of holes 21, each row having five holes uniformly distributed around the surface. The distribution, the dimensions and the numbers of holes 21 may substantially the same as in the cone 20 of FIG. 1.

Figure 3:
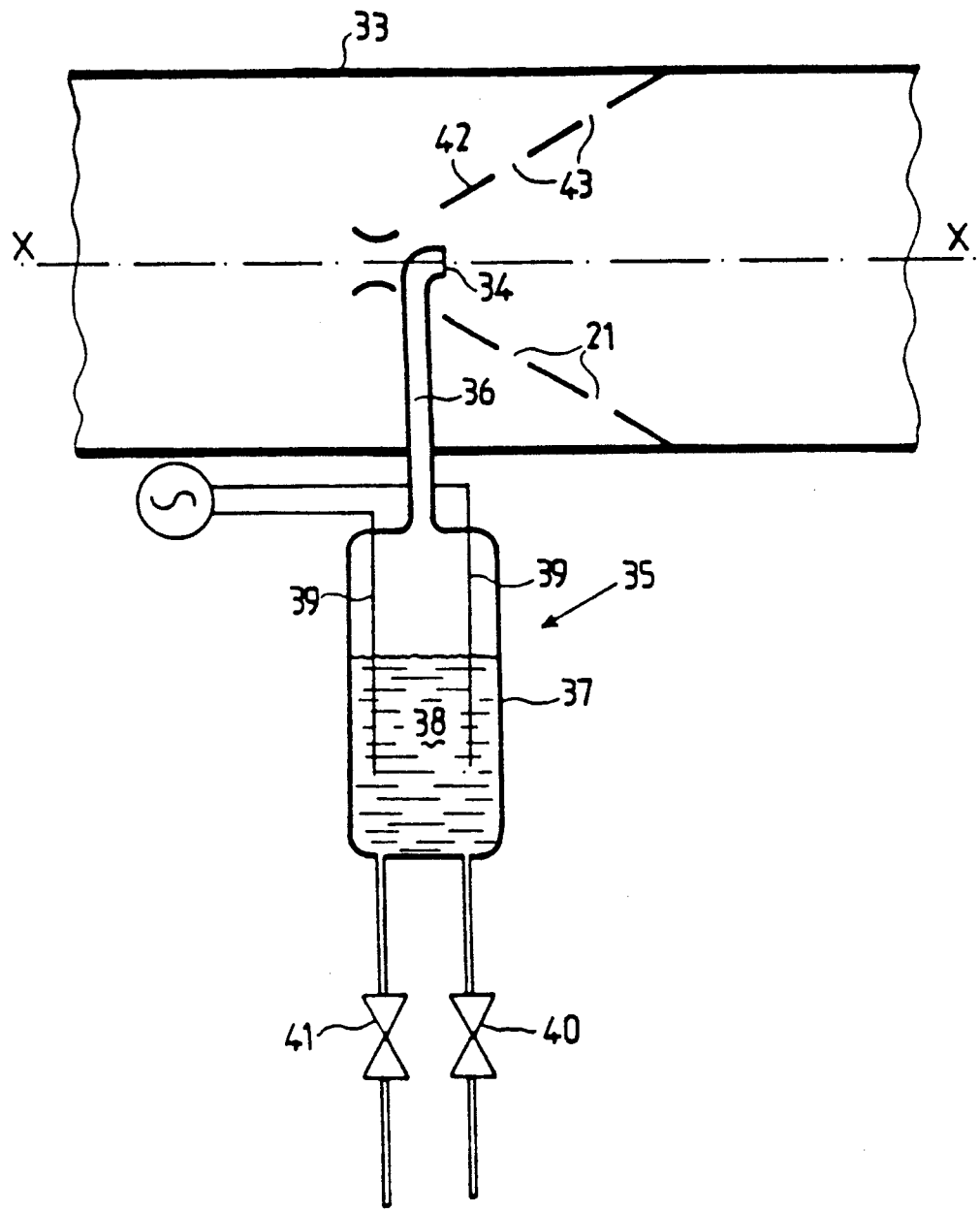
FIG. 3 is a diagram of a second example of execution of a humidifier according to the invention.

In the example of execution of FIG. 3, the atomizer 2 is replaced by a vapor generator.

In the cylindrical shell 33 in which the hot, reheated or preheated air circulates, the direction of circulation of which is, as indicated by the arrow, from left to right as seen in FIG. 3, there is installed on the axis of the shell 33 the outlet mouth 34 of a vapor generator 35, the means of fixation of the mouth 34 in the shell 33 not being shown. The outlet mouth of vapor 34 is connected to the vapor generator 35 by a duct 36 which passes through the wall of the shell 33.

The vapor generator 35 is composed of a receptacle 37 connected to the duct 36 and which contains a certain amount of water 38. Electrodes 39 plunge through the walls of the receptacle 37 into the water 38. When a direct or alternating electric current is caused to pass between the electrodes 39, the resistance of the water charged with minerals brings about by Joule effect a heating. The result is that the water boils and produces vapor which flows by the duct 36 to emerge by the mouth 34 in the direction of air circulation in the shell 33.

The reservoir is connected by way of a valve 40 to a water feed channeling, and, by a valve 41 to an evacuation channeling. The functioning of the valve 40 can be controlled by a water level captor in the reservoir. The intensity of the current passing in the electrodes can be controlled as a function of various parameters.

Around the vapor exit mouth 34 there is mounted the small base of a cone 42 of axis X—X, the large base of which is joined solidly to the inner surface of the shell 33. The cone 42, in example of execution shown, is identical with the cone 20, FIG. 1, and likewise has holes 21.

The lateral wall of the cone 42 is also pierced by holes 21 by which hot air enters the cone. The system of air flow downstream of the cone is turbulent, which assures a homogeneous mixing of the air and of the vapor emitted by the mouth 34.

Upstream of the mouth 34, the cone 42 can be extended over a short distance, diverging upward, to create a more rapid air current immediately around the mouth 34.

Instead of a real divergent cone, such as 42, it is possible, as in the example of execution of FIG. 2, to use an open surface of revolution, the apex of which has essentially the form of a spherical cap 50, the center of this apex being pierced for the passage of the vapor exit mouth 33.

The materials used to construct the cone 42 or the surfaces of revolution 27 may, of course, be the same as those which have been defined for the cone 20. It is also possible to use an evaporator 23 in the examples of FIGS. 2 and 3. It will be noted, finally, that the three examples of a humidifier described above are entirely static and that their weight may not exceed 5 kg.

We claim:

1. A humidifier for an air conditioning system for an aircraft, said system comprising, a shell (1, 33) for circulation of hot air to a humidifier, an atomizer or vaporized water generator having an entrance and an exit, (2, 35) said atomizer or generator being supported in said shell, a water reservoir for delivering liquid water to the entrance of said atomizer or generator, the exit of said atomizer or generator delivering water particles or water vapor, characterized in that the exit of said generator (2, 33) is located at the apex of a conical surface (20, 27, 42) diverging in the direction of air circulation and extending to the wall of the shell (1, 33), the conical surface being pierced by holes (21) through which hot air passes, said hot air encountering the water particles or the water vapor within said conical surface where it mixes with the water particles or vapor and carries them along and further characterized in that said air and said water particles or water vapor mix in a manner which delivers only said water particles or water vapor at said exit, said shell having an open and unimpeded passageway forming said exit free of any liquid water collection means, the atomizing or vaporizing being substantially complete so that no collective tank is required to recover liquid and unvaporized water whereby humidified air is delivered from said unimpeded exit free of large drops of water.

2. Humidifier according to claim 1, characterized in that the conical surface is a frustrum of a cone (20, 42).

3. The humidifier according to claim 1, characterized in that said generator comprises an ultrasonic water atomizer means.

4. Humidifier according to any of claims 1, characterized in that an opening provided at the apex of the conical surface (20, 27) is provided with an air inlet nozzle (25) of Venturi form.

5. Humidifier according to claim 4, characterized in that the smallest diameter of the Venturi nozzle (25) is equal to approximately 0.2 times the diameter of the shell.

6. The humidifier according to claim 1, characterized in that said generator comprises a source of water vapor.

7. The humidifier according to claim 6, characterized in that the source of water vapor comprises a receptacle containing water and having an exit at the base of the conical surface, and further having electrical heating electrodes plunging into said receptacle.

8. Humidifier according to claim 1, characterized in that the conical surface is a surface of revolution (27) open toward downstream, with an apex having practically the form of a spherical cap, the center of said apex being pierced by an outlet passage of the generator (2, 35), and the surface of revolution (27) extending to the wall of the shell.

9. Humidifier according to claim 8, characterized in that the surface of revolution (27) is constituted by a spherical cap pierced in its center and extended by a frustrum of a cone.

10. Humidifier according to claim 9, characterized in that the semi-angle at the apex of the conic frustrum is on the order of 15°.

11. Humidifier according to claim 8, characterized in that the generatrix of the surface of revolution (27) is a parabola pierced at the center of its apex.

12. Humidifier according to claim 11, characterized in that the tangent to the parabola at the point of contact with the shell forms an angle on the order of 15° with the axis (X—X) of the shell.

13. Humidifer according to claim 8, characterized in that the generatrix of the surface of revolution (27) is a branch of a hyperbola pierced at the center of its apex.

14. Humidifier according to claim 13, characterized in that each asymptote (H—H, H'—H') of the hyperbola forms an angle on the order of 15° with the axis (X—X) of the shell.

15. A humidifier for an air conditioning system, comprising, in a shell for circulation of hot air to a humidifier, an atomized or vaporized water generator, the entrance of which receives liquid water and the exit of which delivers water particles or water vapor, characterized in that an exit of said generator is located at an apex of a conical wall having a surface which diverges in the direction of air circulation and extending to the wall of the shell, the conical wall being pierced by holes by which there passes the hot air which encounters the water particles or the water vapor, mixes them there and carries them along, the wall of the conical surface incorporating electric resistance means.

* * * * *